United States Patent

Takanasi et al.

[15] 3,660,583
[45] May 2, 1972

[54] AUTOMATIC RAPID MELTING SYSTEM AND ITS APPLICATION FOR ARC FURNACE

[72] Inventors: Haruo Takanasi, Kasugai; Sadaie Sone, Kuwana; Isamu Eguchi, Nagoya, all of Japan

[73] Assignee: Daido Seiko Kabushiki Kaisha, Minami-ku, Nagoya-shi, Ai hi-ken, Japan

[22] Filed: Mar. 17, 1970

[21] Appl. No.: 20,248

[30] Foreign Application Priority Data

Mar. 17, 1969 Japan..................................44/20175

[52] U.S. Cl..............................................13/12
[51] Int. Cl.............................................F27b 11/10
[58] Field of Search.................................13/12, 13

[56] References Cited

UNITED STATES PATENTS

| 3,243,509 | 3/1966 | Stut | 13/13 X |
| 3,432,604 | 3/1966 | Harbaugh | 13/13 |
| 3,518,350 | 6/1970 | Lunig | 13/12 |

FOREIGN PATENTS OR APPLICATIONS

| 18,835 | 8/1968 | Japan | 13/12 |
| 135,986 | 5/1961 | U.S.S.R. | 13/13 |
| 901,365 | 6/1962 | Great Britain | 13/12 |
| 959,715 | 6/1964 | Great Britain | 13/12 |

Primary Examiner—Harold Broome
Assistant Examiner—F. E. Bell
Attorney—Stevens, Davis, Miller & Mosher

[57] ABSTRACT

An electric power supply program is set for controlling a steel making arc furnace. According to this program, a steel melting period is divided into a plurality of successive melting sections in each of which a predetermined total of electric power is to be supplied to the arc furnace at an optimum power level. The electric power which is actually consumed is integrated during each of said melting sections. Power level is switched from the optimum power level programed for one of said melting sections to that programed for the next section when the amount of electric power consumption actually integrated in said one melting section becomes equal to the predetermined total of electric power programed for said one melting section, thereby a melting electric power is supplied to the arc furnace at the optimum power level programed for said next melting section. A power factor program is also set. According to this power factor program, a melting electric power is to be supplied to the arc furnace with a predetermined power factor to provide an optimum length of arc for each of said melting sections. The power factor is maintained at the predetermined optimum value for each of said melting sections by controlling the current into the arc furnace by use of the deviation of the actual power factor from the power factor programed for the section. Moreover, the total electric power $Y$ which is necessary in melting the charge of steel material is tentatively determined. First electric power $Y_1$ which is consumed for each of a plurality of definite, ever increasing periods from the beginning of melting operation is determined and second electric power $Y_1$ per unit time consumed just before the end of each of said definite periods is determined. The value $X$ of remaining period of time which is expected to be taken before the termination of the melting operation is estimated from the following equation, $X = (y - Y_1)/Y_1$, and the value of $X$ is indicated at every estimation to inform the operator of the remaining period of time from the end of each of said definite periods to the termination of the melting operation.

1 Claims, 9 Drawing Figures

Patented May 2, 1972  3,660,583

HARUO TAKANASI
SADAIE SONE
ISAMU EGUCHI
INVENTORS

BY
Stevens, Davis, Miller & Mosher
ATTORNEYS

AUTOMATIC RAPID MELTING SYSTEM AND ITS APPLICATION FOR ARC FURNACE

BACKGROUND OF THE INVENTION

Recently, as a control method of melting power for arc furnaces, BISRA (British Iron and Steel Research) has developed APIC (Automatic Power Input Control System). In this system, which is disclosed in British Pat. No. 901,365, input power can fundamentally be controlled only by two factors — control of the consumption of melting power and control of the melting time.

With its application to arc furnaces, however, the results by melting are always apt to have the different aspects because of a lack of uniformity in the size and physical characteristics of the materials to be supplied and also an instability of power input, both of which will be easily caused by the change of the power consumption and the melting time.

SUMMARY OF THE INVENTION

The APIC-type control in the first melting stage can be automatically attained through the final power-up to the maximum input ($P_s$) after necessary power inputs ($P_1$, $P_2$), which will previously be fixed, during the given time ($T_1$, $T_2$), as shown in the FIG. 1.

In the abovesaid control, one often has such unsuccessful encounters with inefficient operation and low productivity with the result that the melting time elapsed ($T_1$, $T_2$) in the early melting stage is excessive or sometimes insufficient for optimum control mainly because the process of melting based on their average program will go on without any adjustment to the change of both the charge material and power input condition.

And further, in the BISRA system, it is thought that it is satisfactory if its value of input power consumption equals that of the product of charged material weight and the average input power for melting.

Under such a system, it is natural that inadequate control can be attained as previously referred to in the preceding paragraph.

In consideration of such inefficiency, our system is devised to eliminate these defects in prior art systems.

BRIEF DESCRIPTION OF THE DRAWINGS

A complete understanding of the invention may be obtained from the following detailed description and explanation which refer to the accompanying drawings illustrating the present preferred embodiment.

In the drawings.

Figure 6:
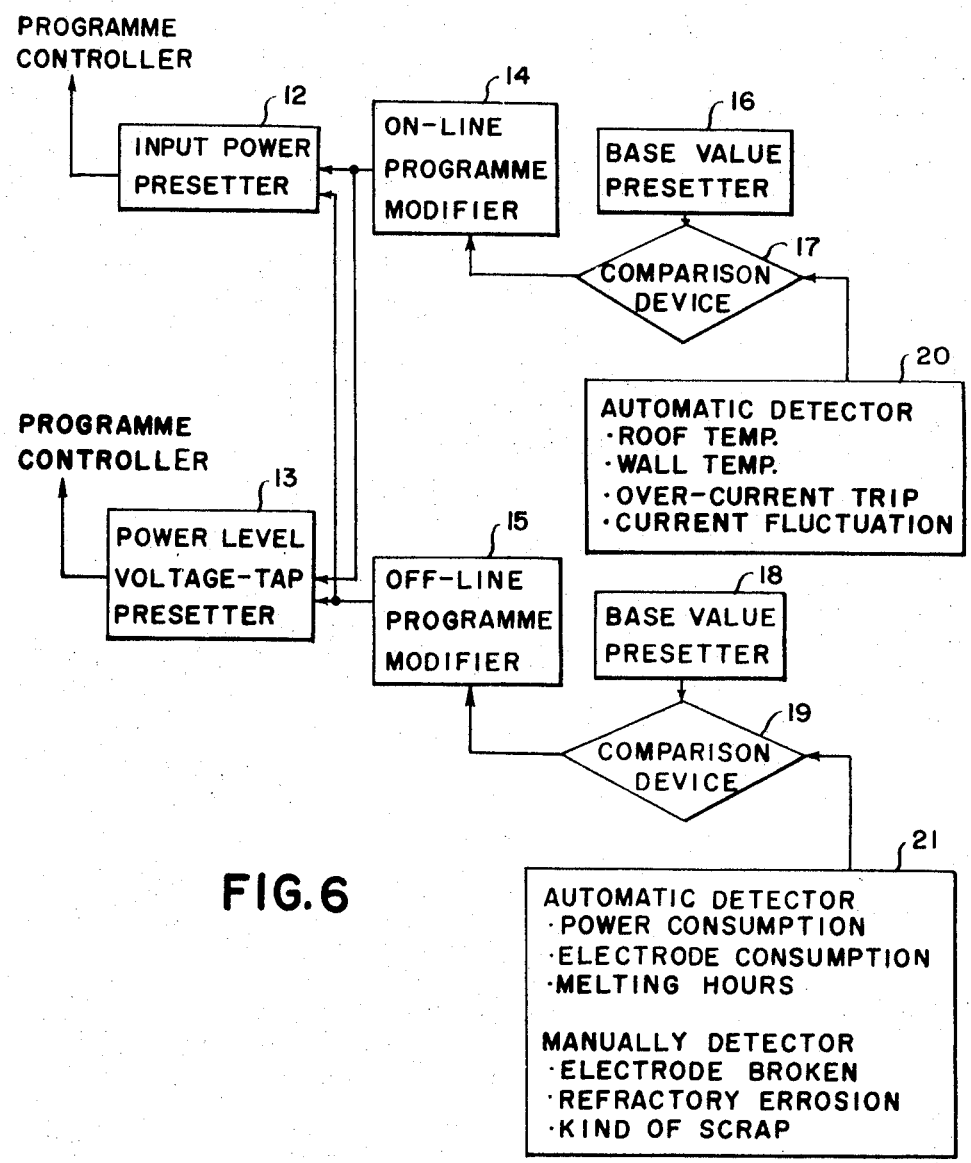
FIG. 6 shows details of the power-factor presetter and current adjuster of FIG. 2.

The power-factor presetter 5 and current adjuster 7 are illustrated in FIG. 6.

As shown in FIG. 6, voltage and current signals from the main circuit of an arc furnace are fed to a power-factor meter PF and thus an output voltage proportional to the power factor is taken out of the power-factor meter PF. A power-factor presetter VR is connected across a stabilized source of direct current E. This power-factor presetter VR sets a power-factor for each of the successive melting sections. The output voltage from the power-factor presetter VR is proportional to its set power-factor. As seen from FIG. 6, the power-factor presetter VR consists of a first set of a relay contact $S_1$ and a potentiometer $VR_1$, a second set of a relay contact $S_2$ and a potentiometer $VR_2$, a third set of a relay contact $S_3$ and a potentiometer $VR_3$, etc., for the successive melting sections, respectively. These relay contacts $S_1$, $S_2$, $S_3$, etc., are sequentially switched on according to the amount of electric power consumption. During a melting section, the output voltage of the power-factor meter PF is compared with the output voltage from the set of relay contacts and potentiometer corresponding to the melting section. If the output voltage of the power-factor meter PF is greater than the output voltage from the power-factor presetter VR, a relay $F_1$ is actuated to cause a current switch for the arc furnace to be driven so that the current flow through the arc furnace may be increased to reduce the power factor. Conversely, if the output voltage of the power-factor meter PF is lower than the output voltage from the power-factor presetter VR, a relay $F_2$ is actuated to cause the current switch to be driven so that the current flow through the arc furnace may be decreased to increase the power-factor. When the output voltage of the power-factor meter PF is equal to the output voltage from the power-factor presetter VR, the present condition is maintained.

The comparison circuit comprising the relays $F_1$ and $F_2$ and diodes may be provided with an integrator A. The difference voltage between the output voltage of the power-factor meter PF and the output voltage from the power-factor presetter VR is integrated by the integrator A for every period as set in a timer T. An average value is obtained from the integrated difference voltage for each period. Relay $F_1$ and $F_2$ is actuated in response to the average value. This means that sampling control can be effected at intervals of the time of period as set in the timer T. Thus, more stable control can be achieved in the arc furnace.

DESCRIPTION OF THE PREFERRED EMBODIMENT

Figure 2:
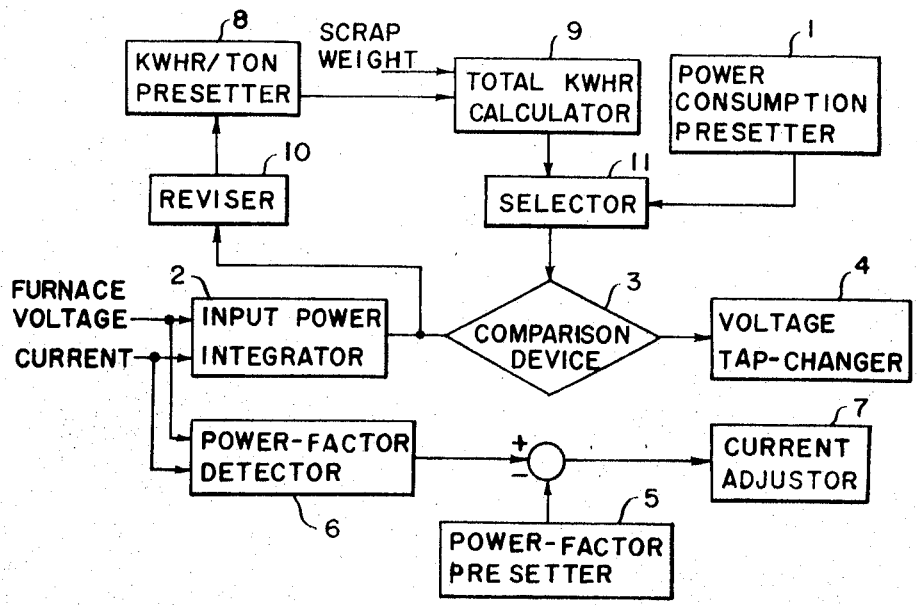
FIG. 2 is a block diagram of control system of our invention.

The system shown in FIG. 2 embodies the main features of this invention.

A. The First Melting Stage

The values of the power consumption according to the scrap weight for each melting section are preset on dial-type switches on the "power consumption presetter" 1, and then compared with the number of pulses from "input power integrator" 2 at "comparison device" 3 which comprises counters and AND circuit elements. When both values become the same, the output from comparison device 3 is sent to the "voltage tap-changer" 4 and the power level is changed to the value preset for the following step. In this processing, the better the conditions of scraps and supply voltage are, the shorter the power steps are, resulting in the higher power feeding rate and thus the productivity can be improved. On the contrary, when the conditions are not good, the changing speed becomes lower, but the procession is held at the level matched to the condition of the scraps and supply voltage.

B. Power-Factor Control

In the arc furnace operation, regulation of the arc length seen between electrode and charge is one of the most important techniques. As the arc length is in proportion to the power-factor, the former can be regulated with the variation of the latter.

The experiment in the practical arc furnace has shown that the power-factor for the optimum operation is about 75 percent in early melting stage, and about 70 percent in the last.

In the method described in this invention, the optimum power-factor is preset on dial-type switches or pin boards at "power-factor presetter" 5 and compared with the load power-factor sent from "power-factor detector" 6 during operation. Through the control of "current adjustor" 7 based on the deviation of the power-factor, i.e., arc length can be held accordingly to the melting stage.

C. Determination of Melting End

The scrap weight and power consumption set on dial-type switches or pin boards in "kwhr./ton presetter" 8 are multipled at "total kwhr. calculator" 9, and compared at 3 with the value of power consumption sent from 2, and then melting end is informed or following process is replaced, when the power consumption reaches the preset value.

On the way, power consumption set in 8 is revised into the proper value by "reviser" 10. In the reviser, modifying curves shown in FIG. 3b are calculated from practice, based on the relation between standard power consumption and melting hours.

Figure 3A:
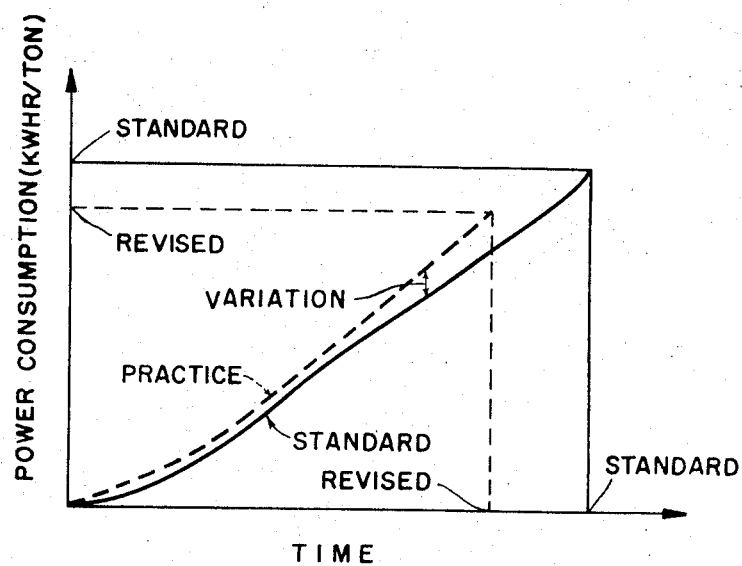
FIG. 3a shows a power consumption development against elapsed time.
Figure 3B:
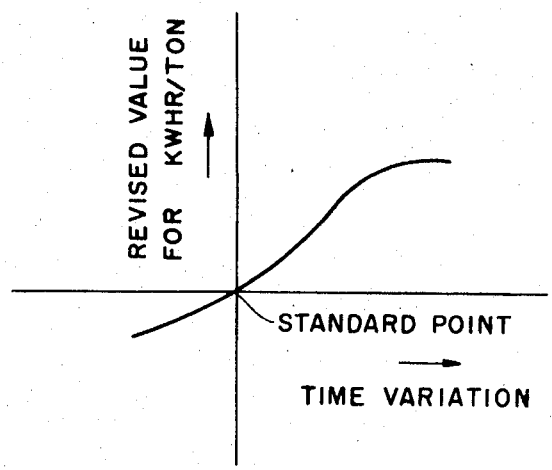
FIG. 3b is a revised curve for power consumption.

For example, when power consumption is off the standard curve, kwhr./ton is modified in response to the deviation based on the modifying curve in FIG. 3b.

At FIG. 3a, when the deviation turns up from the standard curve, power consumption becomes less than standard, and, conversely, when the deviation turns down, power consumption will go on increasing.

Each power step is selected in the "selector" 11 based on the procession of melting.

Figure 7:
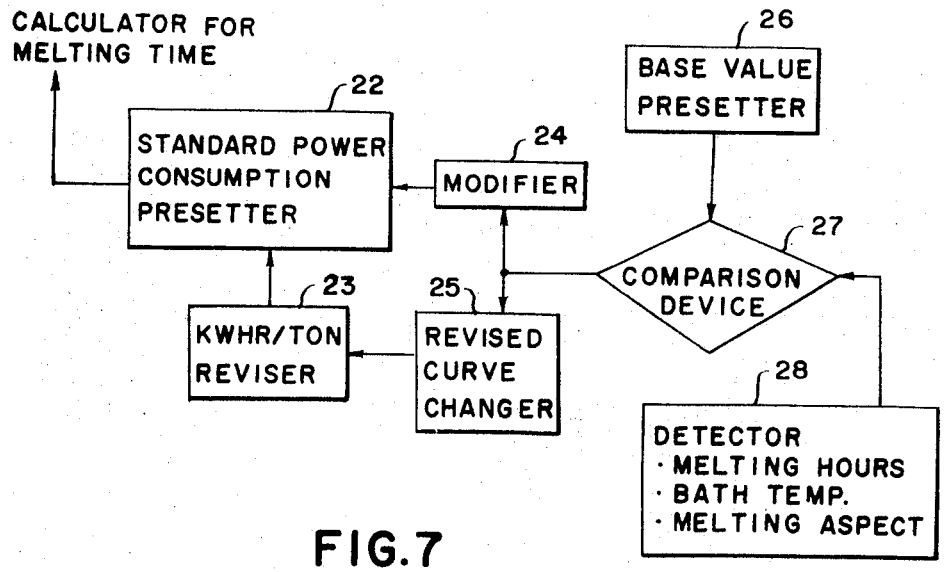
FIG. 7 shows details of the power consumption presetter and reviser of FIG. 2.
Figure 8:
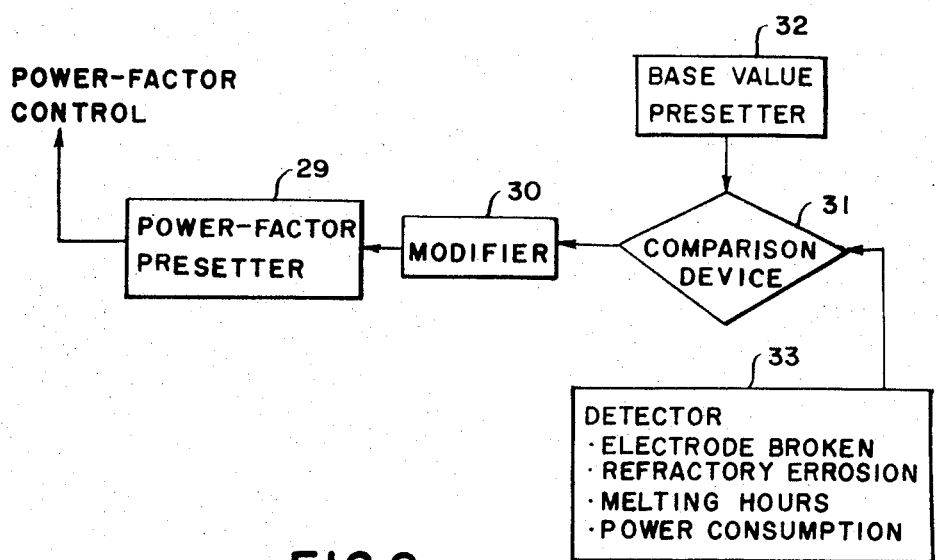

The presetter 1 and reviser 10 are illustrated in FIG. 7.

As shown in FIG. 7, voltage and current signals from the main circuit of an arc furnace are fed to a wattmeter kwhr.

A pulse is produced from the wattmeter KWhr. in response to the consumption of a predetermined amount of electric power. For example, one pulse per 1 kwhr. is generated. These pulses are supplied to a pulse counter 10 C. Power-consumption presetters 1 PR, 2 PR, 3 PR, — for the melting section set a predetermined amount of power consumption for the corresponding melting section at which amount the melting is switched from the corresponding melting section to the next melting section. A relay $V_1$ caused to be energized by a voltage presetter 10 PR through a starting button ST so that a suitable one of the voltage taps of the arc furnace transformer may be selected. When the count of the pulse counter 10 C becomes equal to the predetermined amount of power consumption as set in the presetter 1 PR, the presetter 1 PR generates an output signal. This output signal is fed to a NOT element 1 NT. This causes the output of the NOT element 1 NT to go to zero and then the output of the AND element OAN comes to zero. Thus, the relay $V_1$ which has been energized is deenergized to release the selected tap. Simultaneously, said output signal from the presetter 1 PR is also fed to an AND element 1 AN. Then, a voltage presetter 11 PR is energized and thus a relay $V_2$ is energized so that another suitable voltage tap may be selected. This is equivalent to saying that the voltage applied to the arc furnace is correspondingly changed from one level to another level.

When the count of the pulse counter 10 C becomes equal to the predetermined amount of power consumption as set in the presetter 2 PR, the presetter 2 PR generates an output signal. This output signal is fed to a NOT element 2 NT. This causes the output of the NOT element 2 NT to go to zerio and then the output of the AND element 1 AN comes to zero. Thus, the relay $V_2$ which has been energized through the presetter 11 PR is deenergized to release said another voltage tap. Simultaneously, the output signal from the presetter 2 PR is also fed to an AND element 2 AN. Then, a voltage presetter 12 PR is energized and thus a relay $V_3$ is energized so that a further suitable voltage tap may be selected. In this manner, the voltage applied to the arc furnace can be suitably changed according to the amount of power consumption during melting process.

The weight of the scrap loaded is set in a presetter 21 PR. The amount of power consumption which is usually necessary to melt out a scrap of unit weight is set in a presetter 22 PR. A presetter 23 PR serves as a revising setter. During the melting process, the set value of the presetter 23 PR is automatically modified by a motor M.

The pulse signal from the wattmeter kwhr. is fed to a counter 11 C. When the count of the counter 11 C becomes equal to that corresponding to the weight of the scrap as set in the presetter 21 PR, an output signal is generated. This output signal is supplied to an AND element 11 AN. This signal also resets the counter 11 C. Then, the counter 11 C begins to count the pulse signal from the wattmeter kwhr. Thus, whenever the count of the counter 11 C reaches the value set in the presetter 21 PR, an output signal is supplied to the and element 11 AN. The pulses supplied to the AND element 11 AN are counted by a counter 12 C. When the count of the counter 12 C reaches the value set in the presetter 22 PR, a signal is sent to an AND element 12 AN. This permits the output of the presetter 21 PR to pass to a counter 13 C. Simultaneously, said signal from the presetter 22 PR is also fed to a NOT element 11 NT. This prevents the output signal of the presetter 21 PR from passing to the counter 12 C. The counter 13 C counts the pulses from the AND element 12 AN. When the count of the counter 13 C reaches the value set in the presetter 23 PR, a signal is generated. This signal energizes a relay E so that a signal representative of the termination of the melting operation may be produced. An alarming signal representative of the termination of the melting operation may be generated by use of any contact of the relay E. Alternatively, a source of power for the arc furnace may be switched off by use of any contact of the relay E. The signal representative of the termination of the melting operation is used to reset the counter 13 C to be prepared for the next melting operation. Namely, assume that the weight of loaded scrap as set in the presetter 21 PR is $W_1$, the amount of power consumption necessary to melt out a scrap of unit weight as set in the presetter 22 PR is $P_1$, and the revising value of said amount as set in the presetter 23 PR is $P_2$. When the total PT of pulses fed to the counter 11 C becomes equal to $W_1 \times (P_1 + P_2)$, the relay E is actuated so that a signal representative of the termination of the melting operation may be generated.

D. Operation End Time Information

In the electrical operation of prior art devices, the operator can guess the end time of the operation only by experience and then, after the end of one operation, following operation can the be prepared, thereby resulting in lowered productivity.

In this invention to improve the above mentioned defect, the operator is always informed of the end time during operation and then the operator can perform the preparation of the following operation, resulting in higher productivity and more effective power utilization.

Figure 4:
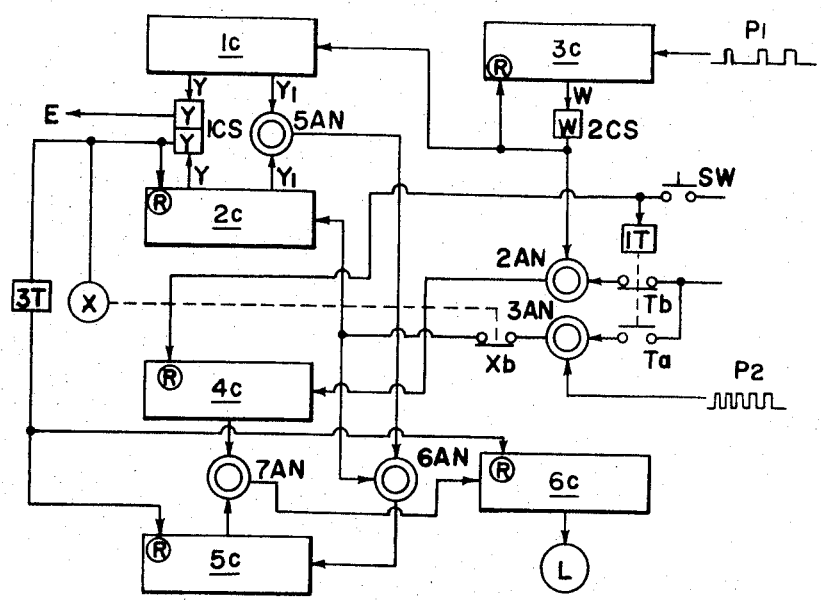
FIG. 4 is a skeleton of control circuit for information of operation end.

Referring now in detail to the drawing, FIG. 4, in the case of practically melting operation in the arc furnace, power consumption per scrap ton (kwhr./t) is based on experimental data. First, the power consumption "Y kwhr./ton" is preset on the select switch "1cs". Total weight "W ton" of charged scrap is preset on the select switch "2cs". Total power required for melting is shown in the equation of $Y \times W$, and melting end will be determined when input power reaches to the value $Y \times W$.

Figure 5:
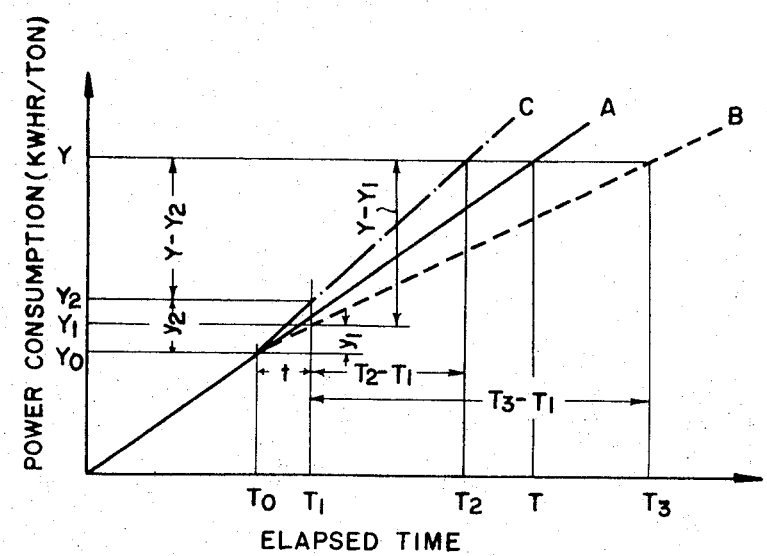
FIG. 5 is the referring curves for information of end time, showing power development against elapsed time.

The detailed motion of the information circuit to which our invention is adapted, is as follows:

Pulse signal "$P_1$" proportional to input power, for example, 1 pulse per kwhr., is put in counter 3c and then, as soon as pulse $P_1$ reaches the set value "W" on the select switch 2cs, a pulse is put in counter 1c and counter 3c is reset. After that, counter 3c counts pulse $P_1$ again. As above mentioned, whenever pulse $P_1$ reaches value "W," one pulse is put in counter 1c. The counter 1c is counted as illustratively shown in FIG. 5, in which power consumption per ton (kwhr./ton) is graduated on the vertical axis and elapsed time on the horizontal axis. Now, the rate of power consumption in operation shown in line "A," time "T" for value W set on the select switch 2cs, means the time required till the melting end. At time $T_o$ on the way of the operation, power consumption is counted during time "$t$" and the counted value "$y_1$" means line B and "$y_2$" means line C. The end time in case of line B is expressed in ($T_3 - T_1$), in case of line C in ($T_2 - T_1$). For example, the time ($T_3 - T_1$) is calculated as follows:

$$\frac{Y - Y_1}{y_1} \times t = T_3 - T_1 = x$$

If the "$t$" is one minute, ($T_3 - T_1$) is expressed at ($Y - Y_1$) minute. Time ($T_2 - T_1$) is expressed at ($Y - Y_1$)/$y_2$ minute.

Referring to FIG. 4, the above equation is illustrated as follows. At first, switch SW excite time relay 1T. After 1 minute, contact Ta will close and Tb will open. Pulses from select switch 2cs are counted on counter 4c through AND gate 2AN during 1 minute. When time relay 1T is reset, counter 4c stops counting and indicate $y_1$.

On the other hand, pulse sign $P_2$ of 30 - 500 1 Hz. generated by the pulse generator (not shown) put on counter 2c through AND gate 3AN. When the counts of the counter 1c from output of counter 3c become the same as the count of the counter 2c by pulse $P_2$, for example at value $Y_1$, AND gate 5AN excites AND gate 6AN, and then pulse $P_2$ is counted at counter 5c through AND gate 6AN. When the counts of the counter 4c and 5c become equal, output from AND gate 7AN is counted to the counter 6c, and the counter by the output of AND gate 7AN is reset.

Then, pulse $P_2$ is counted by the counter 5c again, and the above sequence is repeated till the counts of the counter 2c become value $Y$ preset on the select switch 1CS and its output excite relay "X". By the action of the relay X, the counter 2c, 5c and 6c stop to count pulse $P_2$. The value display on the decatron L based on the counts of the counter 5c, means the information time to the end of the operation. The display is held for a time limited by the time relay 3T, and the counter 2c, 4c, 5c and 6c are reset, and the above sequence is repeated.

As above mentioned, by means of the end information apparatus adding to the arc furnace input power control system, operators can always know the end time of the melting operation, and the preparation for next procession is smoothly arranged and the working efficiency is greatly improved.

E. Improvement of the Program

As above mentioned, the control system to which our invention may be applied, is mainly based on the program control. Then, it is desirable that the control program is improved for optimum control by means of the modification of the various values preset on the control program and the function of the standard power consumption and melting time. The improvement of the program is accomplished by the research of the optimum set value through learning the practical operation.

Figure 1:
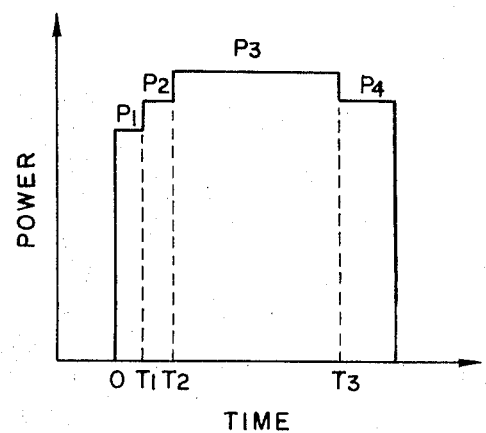
FIG. 1 is a graph of input power level against elapsed time.

Referring to FIG. 1, for example, set power level $P_1$, $P_2$ are limited by the conditions of the refractory life of the furnace roof, and wall, electrode broken, over-current trip, etc. On the other hand, it is desirable that power level $P_1$ and $P_2$ be set at higher value because of the advance of productivity and the low power consumption. Therefore, power level $P_1$ and $P_2$ are determined from the entire view of the furnace conditions, but usually are set in the value estimated from the past experimentation, so that it is not sure to set in optimum value.

The improvement of the set value to optimum value will be carried out by the accumulation and study of sufficient practical data to cover the various conditions of the charge, furnace, and supply voltage. The effects of furnace operation may change due to variation of programmed set values. It is, therefore, difficult to accumulate and study various data then and there.

The control apparatus for which our invention is adapted, can automatically carry out the accumulation and study of many data and the resulting improvement of the program.

The arc furnace melting control system can really exhibit its control capacity by means of the program improving apparatus as above mentioned. Some examples for relations between programmed items and check points are shown as follows:

1. About set values of input power level, voltage taps and power consumption for early melting stage
   (1) Erosion, life and temperature of roof refractories,
   (2) Electrode broken troubles and their causes,
   (3) Aspect of consumed top of each electrode,
   (4) Trips of main circuit breaker due to over current,
   (5) Swing of arc current,
   (6) Local errosion of hearth refractories,
   (7) Rate of electrode boring and so on.
2. About set value of input power level, voltage taps and power consumption for melting later stage:
   (1) Erosion, life and temperature of wall refractories,
   (2) Electrode broken troubles and their causes,
   (3) Trips of main circuit breaker due to over current,
   (4) Electrode consumption,
   (5) Power consumption,
   (6) Productivity, and so on.
3. About set values of power consumption for whole melting:
   (1) Melting aspects and bath temperature,
   (2) Productivity, and so on.
4. About set value of power-factor fitting to melting process:
   (1) Electrode broken troubles and their causes,
   (2) Erosion, life and temperature of refractories,
   (3) Productivity,
   (4) Power consumption, and so on.

It will be evident from the foregoing that our invention is characterized by numerous advantages. In the first place, the arc furnace may be operated at optimum input power level. In the second place, power consumption can be modified to a suitable value for melting conditions. Third, arc length for melting can be controlled by means of power-factor control. Fourth, control program may be optimized through set value improving system.

What is claimed is:

1. A method of controlling a steel making arc furnace including the steps of:
   a. setting an electric power supply program according to which a steel melting period is divided into a plurality of successive melting sections, a predetermined total of electric power being supplied to the arc furnace at an optimum power level in each of said melting sections; integrating the electric power actually consumed during each of said melting sections; and switching power levels from the optimum power level programmed for one of said melting sections to that programmed for the next section when the amount of electric power consumption actually integrated in said one melting section becomes equal to the predetermined total of electric power programmed for said one melting section, melting electric power thereby being supplied to the arc furnace at the optimum power level programmed for said next melting section;
   b. setting a power factor program according to which melting electric power is to be supplied to the arc furnace with a predetermined power factor to provide an optimum length of arc for each of said melting sections; and maintaining the power factor at the predetermined optimum value for each of said melting sections by controlling the current into the arc furnace as a function of the deviation of the actual power factor from the power factor programmed for the section; and
   c. determining tentatively the total electric power $Y$ which is necessary in melting the charge of steel material; determining a first electric power $Y_1$ which is consumed for each of a plurality of definite, ever increasing periods from the beginning of the melting operation; determining a second electric power $Y_1$ per unit time consumed just before the end of each of said definite periods; estimating the value $X$ of the remaining period of time which is expected to be taken before the termination of the melting operation from the following equation, $X=(Y-Y_1)/Y_1$ ; and indicating at every estimation the value of $X$ to inform the operator of the remaining period of time from the end of each of said definite periods to the termination of the melting operation.

* * * * *